United States Patent
Hazan et al.

(10) Patent No.: US 12,481,910 B2
(45) Date of Patent: Nov. 25, 2025

(54) METHOD AND SYSTEM FOR PREDICTING A MOTION TRAJECTORY OF A ROBOT MOVING BETWEEN A GIVEN PAIR OF ROBOTIC LOCATIONS

(71) Applicant: SIEMENS INDUSTRY SOFTWARE LTD., Tel Aviv (IL)

(72) Inventors: Moshe Hazan, Elad (IL); Zohar Bengad, Rehovot (IL)

(73) Assignee: Siemens Industry Software Ltd., Tel Aviv (IL)

( * ) Notice: Subject to any disclaimer, the term of this patent is extended or adjusted under 35 U.S.C. 154(b) by 965 days.

(21) Appl. No.: 16/196,156

(22) Filed: Nov. 20, 2018

(65) Prior Publication Data
US 2020/0160210 A1   May 21, 2020

(51) Int. Cl.
G06N 20/00   (2019.01)
G06N 5/022   (2023.01)

(52) U.S. Cl.
CPC ............. *G06N 20/00* (2019.01); *G06N 5/022* (2013.01)

(58) Field of Classification Search
CPC ................................ G06N 20/00; G06N 5/022
See application file for complete search history.

(56) References Cited

U.S. PATENT DOCUMENTS

| 8,099,374 B2 | 1/2012 | Iba |
| 8,958,912 B2 | 2/2015 | Blumberg et al. |
| 9,463,571 B2* | 10/2016 | Sinyavskiy .......... G05D 1/0088 |
| 10,678,210 B2 | 6/2020 | Haddadin et al. |
| 10,810,425 B2 | 10/2020 | Li et al. |
| 2009/0326710 A1 | 12/2009 | Iba |

(Continued)

FOREIGN PATENT DOCUMENTS

| CN | 102024180 A | 4/2011 |
| CN | 102554938 A | 7/2012 |

(Continued)

OTHER PUBLICATIONS

Arthur L. Carpenter. Are You Missing Out? Working with Missing Values to Make the Most of What is not There. 2014. (Year: 2014).*

(Continued)

*Primary Examiner* — Shahid K Khan
*Assistant Examiner* — Beatriz Ramirez Bravo
(74) *Attorney, Agent, or Firm* — Laurence A. Greenberg; Werner H. Stemer; Ralph E. Locher

(57) ABSTRACT

Systems and a method for predicting a motion trajectory of a robot moving between a given pair of robotic locations. Training data of motion trajectories of the robot are received for a plurality of robotic location pairs. The training data are processed so as to obtain x tuples and y tuples for machine learning purposes; wherein the x tuples describe the robotic location pair and the y tuples describe one or more intermediate robotic locations at specific time stamps during the motion of the robot between the locations of the location pair. From the processed data, a function is learned for mapping the x tuples into the y tuples so as to generate a motion prediction module for the robot. For a given robotic location pair, the robotic motion between the given pair is predicted by obtaining the corresponding intermediate locations resulting from the motion prediction module.

7 Claims, 5 Drawing Sheets

(56) References Cited

U.S. PATENT DOCUMENTS

| | | | |
|---|---|---|---|
| 2011/0153080 A1 | 6/2011 | Shapiro et al. | |
| 2015/0094855 A1 | 4/2015 | Chemouny | |
| 2015/0127149 A1* | 5/2015 | Sinyavskiy | G06N 3/008 700/250 |
| 2016/0031083 A1 | 2/2016 | Embon et al. | |
| 2017/0190051 A1 | 7/2017 | O'Sullivan et al. | |
| 2017/0190052 A1* | 7/2017 | Jaekel | B25J 9/1666 |
| 2019/0314989 A1 | 10/2019 | Sokabe et al. | |
| 2019/0369641 A1* | 12/2019 | Gillett | G05D 1/0212 |
| 2020/0353622 A1* | 11/2020 | Borges Oliveira | G06V 10/774 |

FOREIGN PATENT DOCUMENTS

| | | |
|---|---|---|
| CN | 103631142 A | 3/2014 |
| CN | 104049534 A | 9/2014 |
| CN | 104635714 A | 5/2015 |
| CN | 104640677 A | 5/2015 |
| CN | 105773623 A | 7/2016 |
| CN | 106600000 A | 4/2017 |
| CN | 106774327 A | 5/2017 |
| CN | 106965187 A | 7/2017 |
| CN | 107102644 A | 8/2017 |
| CN | 107225571 A | 10/2017 |
| CN | 107511823 A | 12/2017 |
| CN | 107548336 A | 1/2018 |
| CN | 107645979 A | 1/2018 |
| CN | 108255182 A | 7/2018 |
| CN | 108481328 A | 9/2018 |
| EP | 2898996 A1 | 7/2015 |
| JP | 2010005762 A | 1/2010 |
| WO | 2016141542 A1 | 9/2016 |
| WO | 2017134735 A1 | 8/2017 |
| WO | 2018143003 A1 | 8/2018 |

OTHER PUBLICATIONS

Nikolay Jetchev, Marc Toussaint. Trajectory Prediction: Learning to Map Situations to Robot Trajectories. 2009. International Conference on Machine Learning (Year: 2009).*

Geeks. Replacing strings with numbers in Python for Data Analysis. Feb. 2018. Geeksforgeeks.org. https://www.geeksforgeeks.org/replacing-strings-with-numbers-in-python-for-data-analysis/ (Year: 2018).*

Rösmann et al., "Trajectory modification considering dynamic constraints of autonomous robots", ROBOTIK 2012; 7th German Conference on Robotics (Year: 2012).*

Wang Junsong et al., "Manipulator distributed intelligent control based on NFI-CMAC". Engineering Journal of Wuhan University, vol. 37 No. 6, 1671-8844 (2004) 06-059-03, p. 60-61, Dec. 30, 2004—English abstract.

Ding Dukun et al: "Industry Robot Intelligent Kinematic Model", Machinery Design & Manufacture, No. 8, p. 242-244, 1001-3997 (2017) 08-0242-03, Aug. 8, 2017—English abstract.

* cited by examiner

METHOD AND SYSTEM FOR PREDICTING A MOTION TRAJECTORY OF A ROBOT MOVING BETWEEN A GIVEN PAIR OF ROBOTIC LOCATIONS

BACKGROUND OF THE INVENTION

Field of the Invention

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to production environment simulation.

Manufacturing customers using software applications for robotic motion simulation, for example, Off Line Programming ("OLP") applications and other virtual robotic simulation applications and systems, expect high performance regarding the accuracy of the motion simulation of a specific robot of a given vendor.

Examples of virtual simulation systems include, but are not limited to, Computer Assisted Robotic ("CAR") tools, Process Simulate (a product of Siemens PLM software suite), robotic simulations tools, and other systems for industrial simulation.

In order to meet the expectations of accurate robotic motion simulations, major robot vendors agreed on a Realistic Robot Simulation ("RRS") protocol for enabling their customers to simulate their supplied robots. The Robot Controller Software ("RCS") modules having the RRS protocol advantageously provide, among other functionalities, a motion prediction module allowing accurate robotic motion predictions and simulations.

Nowadays, there are more and more industrial robotic vendors which are medium and small sized companies that do not provide any RCS module with their supplied robots in order to save costs.

For simulating specific industrial robots having no RCS module, manufacturing customers often make use of CAR tools providing generic motion planners mimicking the motion behavior of the specific robots via user configurations. Typically, the users configure such motion planners by inputting the motion behavior and the physical characteristics of the specific robot, e.g. number of joints, movement constraints, weight of joints, and other characteristics which have an impact to the prediction of the movements of this specific robot.

Typically, generic motion planners may not be suitable for robots with unpublished motion behavior and/or unpublished physical characteristics and they often do not support all types of robotic kinematics. Moreover, even when a specific robot is supported by such generic motion planners, its motion prediction results are often not accurate enough.

In addition, even for robots having their own RCS modules, manufacturing customers are not particularly eager to depend on proprietary RCS modules having high RSS licensing costs and sometimes having slow external client-server RSS communication.

Therefore, improved techniques for predicting the motion trajectory of a specific robot are desirable.

SUMMARY OF THE INVENTION

Various disclosed embodiments include methods, systems, and computer readable mediums for predicting a motion trajectory of a robot moving between a given pair of robotic locations. A method includes receiving training data of motion trajectories of the robot for a plurality of robotic location pairs. The method includes processing the training data so as to obtain x tuples and y tuples for machine learning purposes; wherein the x tuples describe the robotic location pair and the y tuples describe one or more intermediate robotic locations at specific time stamps during the motion of the robot between the location pair. The method further includes learning from the processed data a function mapping the x tuples into the y tuples so as to generate a motion prediction module for the robot. The method further includes predicting, for a given robotic location pair, the robotic motion between the given pair by getting the corresponding intermediate locations resulting from the motion prediction module.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the detailed description below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Other features which are considered as characteristic for the invention are set forth in the appended claims.

Although the invention is illustrated and described herein as embodied in a method and system for predicting a motion trajectory of a robot moving between a given pair of robotic locations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for predicting a motion trajectory of a specific robot moving between a given pair of robotic locations have some drawbacks. The embodiments disclosed herein provide numerous technical benefits, including but not limited to the following examples.

Embodiments enable accurate motion simulation of a specific robot having no RCS modules.

Embodiments enable accurate motion simulation of a specific robot without launching an RCS service.

Embodiments enable saving RRS license costs.

Embodiments enable fast data communication not depending on external client-server communication of RRS.

Embodiments enable motion simulation of a specific robot without the need to inputting several manual configurations as with generic motion planners.

Embodiments enable a virtual simulation system to support a broad spectrum of robots of a broad spectrum of robot's vendors.

Embodiments may be used to simulate the motion of robots having complex kinematics as, for example, delta robots or other next generation robots.

Embodiments may be used for robot validation purposes.

Figure 1:
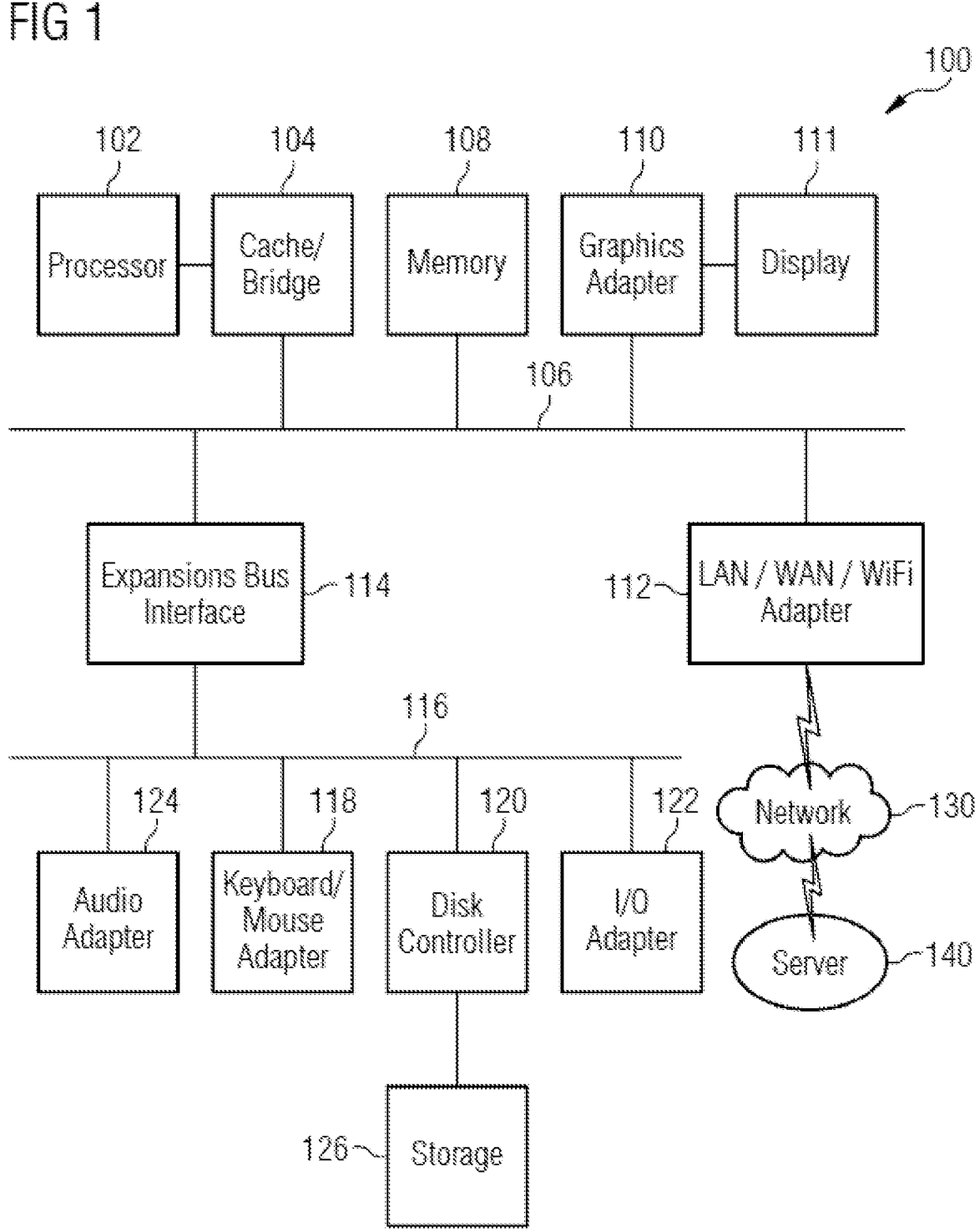
FIG. 1 illustrates a block diagram of a data processing system in which an embodiment of the invention can be implemented.

Referring now to the figures of the drawing in detail and first, particularly, to FIG. 1 thereof, there is shown a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
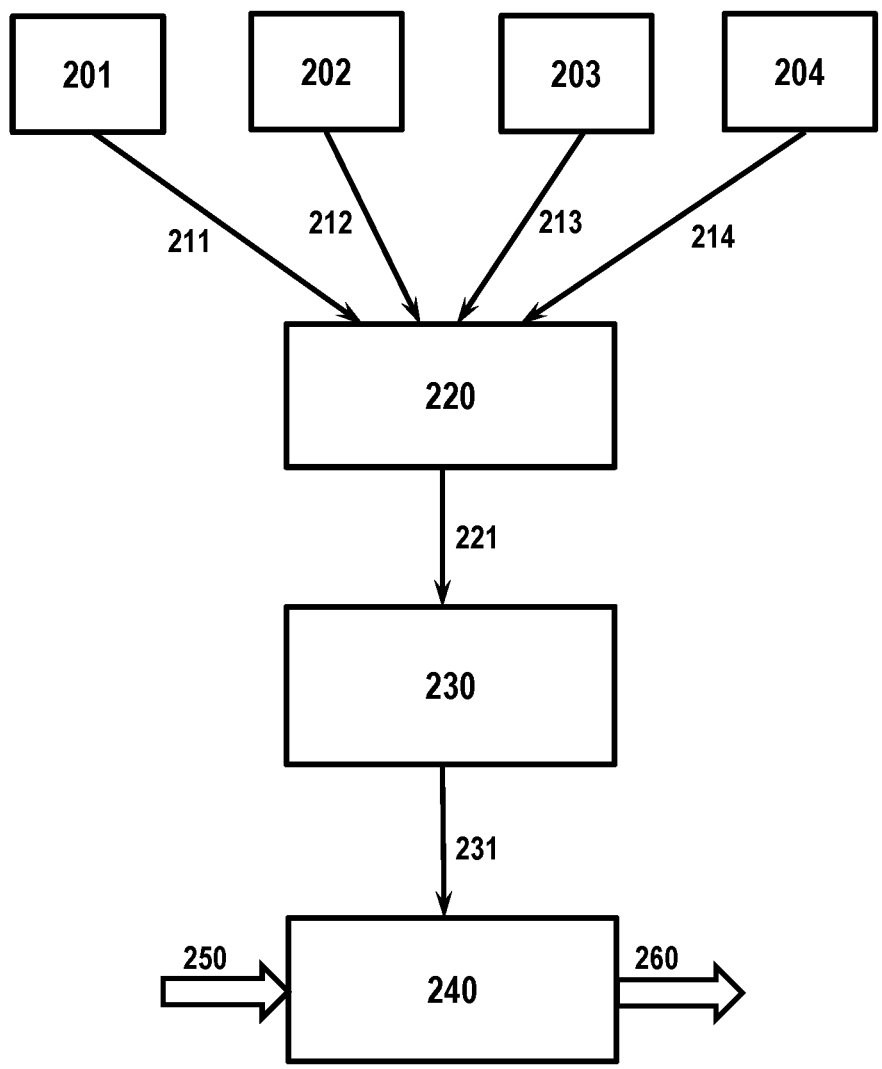
FIG. 2 is a block diagram schematically illustrating a plurality of training data sources in accordance with disclosed embodiments.

FIG. 2 is a block diagram schematically illustrating a plurality of training data sources in accordance with disclosed embodiments.

For an industrial robot (not shown) of a specific type and vendor, motion training data 211, 212, 213, 214 can be received from different types of data sources 201, 202, 203, 204.

As used herein, the term robot indicates an industrial robot, any other type of robot, or any type of kinematic machine.

A first type of data sources 201, 202 provide data retrieved from real motion of the specific physical robot and a second type of data sources 203, 204 provide data retrieved from simulated motion of a virtual representation of the specific physical robot, herein called virtual robot. In embodiments, hybrid data sources combining the above may be provided. Robot vendors may advantageously provide motion training data derived from different data sources.

Physical data sources 201, 202 include video-cameras 201 or robotic Application Program Interfaces ("APIs") 202 recording robotic motion trajectories and the related parameters during the motion of the specific physical industrial robot while moving between a pair of robotic locations. The pair of robotic locations are a source location and a target location, for example a desired start point and end point of a robot's Tool Center Point Frame ("TCPF") or, in other embodiments, of a robot's Tool Center Point ("TCP").

Simulated data sources 203, 204 includes RCS modules 203 and Virtual Robot Controllers ("VRC") 204 simulating the robotic motion trajectories and the corresponding motion parameters during the motion of a virtual industrial robot between the robotic location pair.

In embodiments, the virtual robot (not shown) is loaded in a robotic simulation environment where training motion data can be generated. Examples of robotic simulation environment includes but are not limited to CAR tool applications using RCS modules 203 or proprietary robot simulation applications using vendor-specific VRC controllers 204.

In embodiments, data sets from virtual data are prepared.

In embodiments, motion training data from simulated data sources, are generated by running a plurality of processes, preferably in the background and/or in parallel. Conveniently, the required calculations may be done without graphics. Moreover, the processes may advantageously run calculation in a fast manner since there is a single virtual robot performing motion only, with no need for signals, logic and/or context.

Each process may run a plurality of simulations from reachable source location to reachable target locations, each time with different robotic motion information and parameters. Examples of robotic motion information include, but are not limited to, motion type, configuration, speed, acceleration and zone.

Inputs to the simulations are position and/or motion data on the robotic location pairs, i.e. the source location and the target location. For example, in embodiments, position and motion data on the source location may be given as 3D location coordinates with current motion values and target location data may be given as 3D location coordinates with its desired robotic motion instructions/parameters. In other embodiments, position data on the location pair may be given as current robot poses (e.g. joint values) and target robot's poses (e.g. joint values).

During each single simulation, a large amount of information data may preferably be gathered.

Figure 3:
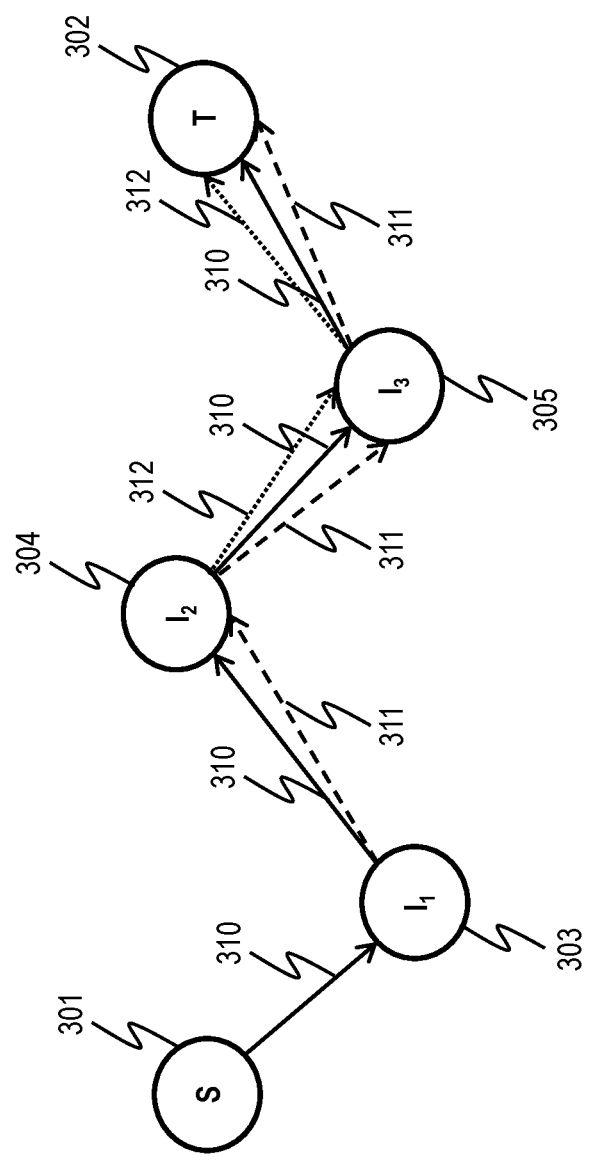
FIG. 3 is a graph schematically illustrating how to increase training data in accordance with disclosed embodiments.

In embodiments, to increase the amount of motion training data sets, source locations other than the original main source location may be used as exemplified in the embodiment of FIG. 3.

Multiple training data sets may be generated from a single virtual robot's motion or a single tracked physical robot's motion. For the same original target location, different training data sets can be generated by using different intermediate locations as start locations. In embodiments, the target location is the original target of the tracked movement for all these sets. For each generated set, input data for the start location are included in tuple x.

FIG. 3 is a graph schematically illustrating how to increase training data in accordance with disclosed embodiments.

An original main robotic location pair 301, 302 is illustrated, comprising the original main source location 301 and the original main target location 302. Between the main location pair, a plurality of intermediate robotic locations 303, 304, 305, are collected along the motion trajectory of the robot's TCPF (not shown). For any couple of source location (first or intermediate) and target location (the original motion target) data are collected as a list of robot poses versus delta times, preferably including corresponding robotic motion parameters.

In FIG. 3, the robotic locations 301, 302, 303, 304, 305 are nodes of three directed graphs 310, 311, 312 each representing a robotic motion from a source node to a target node. The original main graph 310 goes from the main source node 301 to main target node 302. The other two generated direct graphs 311, 312 obtained by adding the corresponding edges 311, 312 go from intermediate nodes 303, 304 to the end node 302. In embodiments, other graphs may be generated.

Hence, as shown in FIG. 3, the amount of training data sets can be advantageously increased by adding intermediate locations between the location pair along the robot's TCPF trajectory.

In embodiments, the received motion training data 211, 212, 213, 214, received from one or more of each data source 201, 202, 203, 204, are processed in a processing module 220 so as to be organized in x,y tuples data tables for machine learning purposes.

In an exemplary embodiment, the data file for machine learning purposes may be organized as follows:

x tuples: source location position $(X,Y,Z,R_X,R_Y,R_Z)$ with its current location motion value (configuration, speed), target location $(X,Y,Z,R_X,R_Y,R_Z)$ with its current motion parameters (e.g. motion type, configuration, speed, acceleration, motion type, zone);

y tuples: list of robotic pose values $(j_1, j_2, j_3, j_4, j_5, j_6)$.

Where the x tuples describe the robotic location pair with position and motion information and the y tuples describe intermediate robotic location with poses along the motion trajectory between the location pair.

It is noted that each value inside the y tuple (e.g. in this specific example the list of sextets of joint values) represents a value at a specific time during motion. In embodiments, the data sets may preferably have the same time reference values. For example for a motion starting at time $T_S$ and ending the latest at time $T_T$, the time references might be the sampling of the robot's state at fixed intervals. In embodiments where the sampling times are predefined, the time of each sampled value can be deduced from its index in the y tuple. In other embodiments, where values may be sampled at non predefined time intervals, the sampling time values may preferably be included in the y tuples together with the other intermediate location values.

As used herein, the terms "pair of robotic locations" indicate source location and target location referring respectively to a start of robotic motion and an end of robotic motion during the robotic motion defining the desired robotic input bounds.

In embodiments, other robotic input bounds may be added. For example in case of circular motion of the robot, a third location between the start point and the target point, usually called circular point, is needed to define the robotic input bound. Therefore, in case of circular motion, the x tuples describe a robotic location triplet, a location pair, and a third location being the circular location.

For machine learning purposes, the number of columns denoted as M should preferably be the same for all locations; however there might be cases in which the lists of intermediate poses have different lengths, denoted as $N_0$, $N_1$, $N_i$<M due to the different numbers of robot's poses necessary to reach a given target location departing from a given source location. In embodiments, to obtain data sets with the same number of columns M, the last pose may be duplicated as many times as necessary to get to M columns.

In embodiments, the processed data 221 entering machine learning module 230 may preferably be in a numerical data format. In embodiments, where motion parameters are in a non-numerical data format, e.g. in a string format or in other non-numerical formats, a "hash of configuration" is generated to contain a numeric configuration index versus the configuration string so that a numerical data form can be used. Illustrated below is a simplified example of a map of robotic configuration strings and the corresponding index:

TABLE 1

| example of hash of configurations. | |
|---|---|
| J5 + J6 – OH– | 1 |
| J5 – J6 + OH– | 2 |
| J5 – J6 + OH+ | 3 |
| J5 + J6 – OH+ | 4 |

In embodiments, when a new configuration not present in the map is encountered, the new configuration is conveniently inserted in the table with a new index.

In embodiments, if the specific robot cannot reach a desired target location from a desired source location, the robotic pose of the source location is duplicated until reaching the desired M columns.

The processed data 221 is elaborated to extract a learned function with a Machine Learning (ML) algorithm, preferably with a machine learning algorithm selected from the group of supervised learning algorithms. The learned function $f_{ML}$ is such that it can map at its best the x variable tuples into the y variable tuples.

The goal of the used ML algorithm is to approximate the mapping function so well that for a given input data (x tuple), the output variables (y tuple) can be predicted for that given input data.

Extracted learned function data 231 are used to generate a motion prediction module 240 for the specific robot used.

The motion prediction module 240 predicts the motion of this specific robot so that when receiving as input a robotic location pair 250, in the form of x variable tuple values, it provides as resulting output 260 the y variable tuple values describing the intermediate motion trajectory of the specific robot.

In embodiments, the motion prediction module 240 may be used as a stand-alone module, e.g. a cloud service for motion planning, etc. In other embodiments, the motion prediction module may be used as a stand-alone module by a virtual simulation system. In other embodiments, the motion prediction module may be embedded 240 within a virtual simulation system. In other embodiments, in the form of "hybrid configurations", the prediction module 240 can be used—standalone or embedded—in conjunction with one or more motion planning modules, as for example, prediction modules of generic motion planners, RCS modules, and others.

Figure 4:
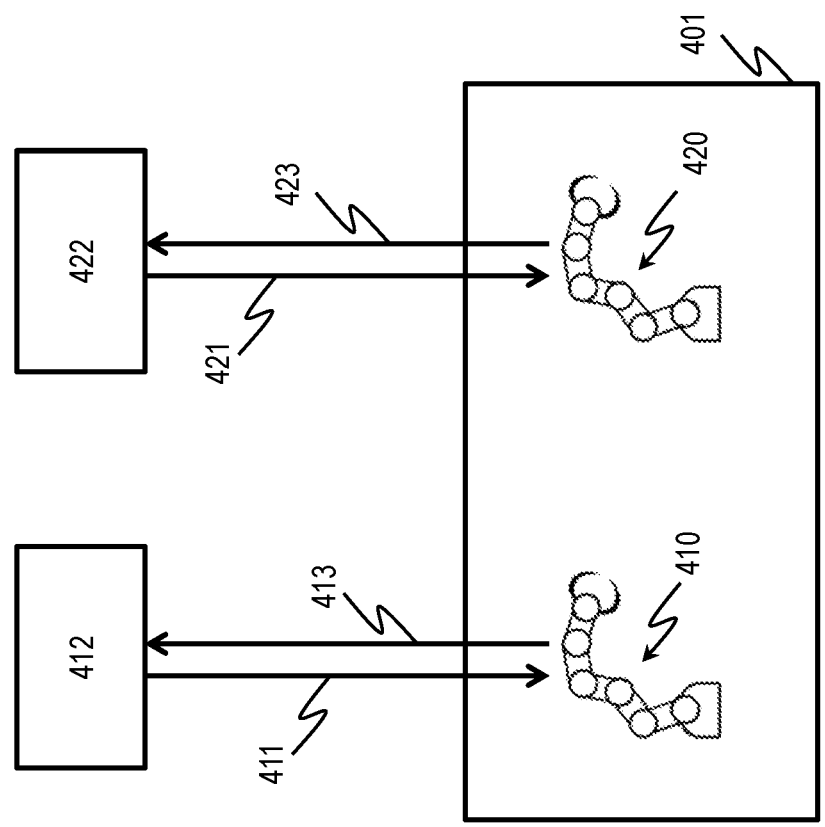
FIG. 4 is a block diagram schematically illustrating a plurality of motion prediction modules in accordance with disclosed embodiments.

FIG. 4 is a block diagram schematically illustrating a plurality of motion prediction modules in accordance with disclosed embodiments.

In embodiments, a virtual simulation system 401 simulates the motion behavior of one or more specific robots of one or more specific robot vendors with a plurality of ML motion prediction modules 412, 422.

In the exemplary embodiment of FIG. 4, a first robot 410 may be a specific model of an ABB robot and the second robot 420 may be a specific model of a KUKA robot.

The virtual simulation system predicts the motion behavior of the specific robot 410, 420 by inputting the data on a given robotic location pair 411, 412 into the corresponding specific ML motion prediction module 412, 422 and by receiving the ML predicted motion plan 413, 423 of the specific robot during its motion between the inputted robotic location pair 411, 421.

Figure 5:
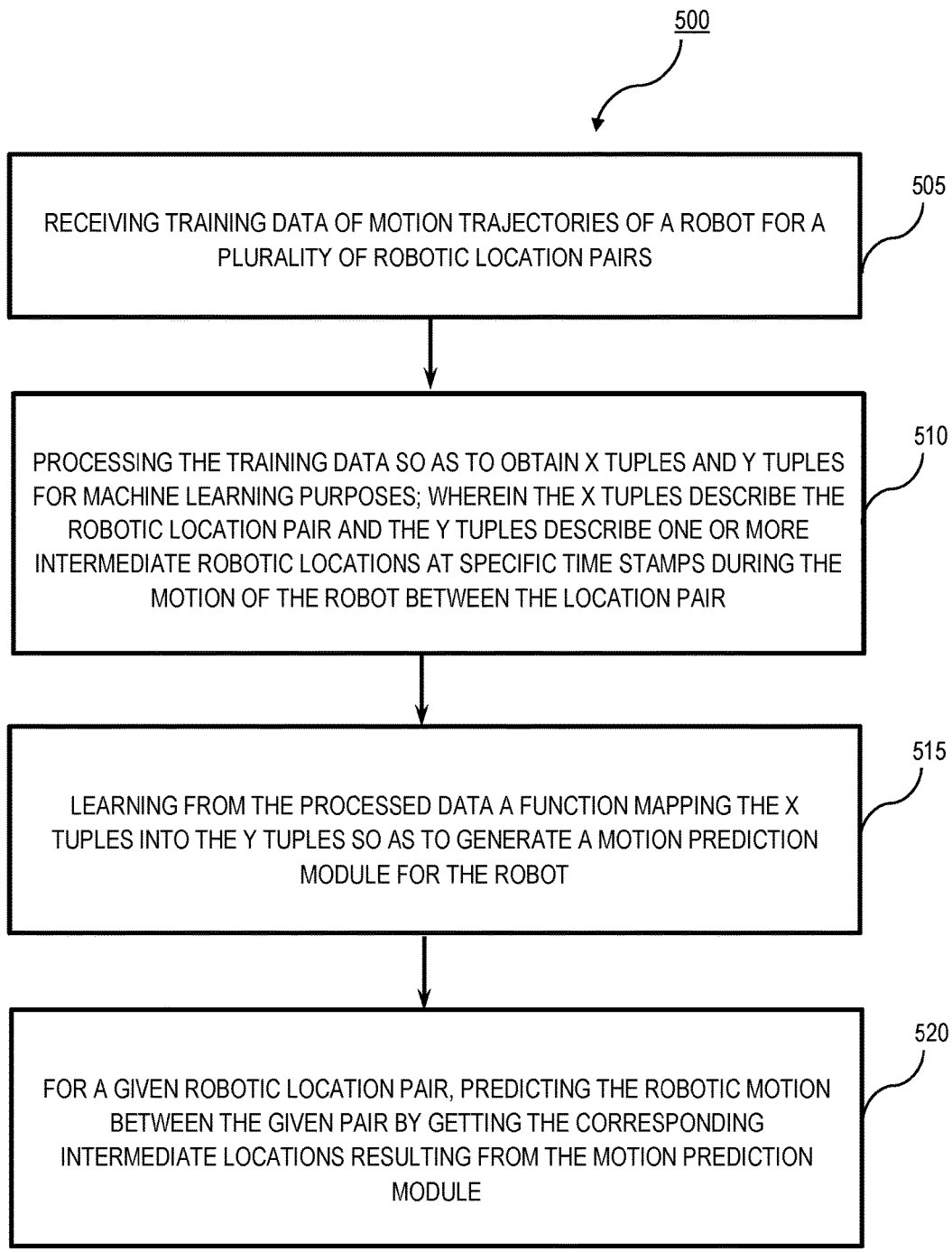
FIG. 5 illustrates a flowchart for predicting a motion trajectory of a robot in accordance with disclosed embodiments.

FIG. 5 illustrates a flowchart 500 of a method for predicting a motion trajectory of a specific robot moving between a given pair of robotic locations in accordance with disclosed embodiments. Such method can be performed, for example, by system 100 of FIG. 1 described above, but the "system" in the process below can be any apparatus configured to perform a process as described.

At act 505, training data of motion trajectories of the specific robot are received for a plurality of robotic location pairs.

At act 510, the training data is processed so as to obtain x tuples and y tuples for machine learning purposes. The x tuples describe the robotic location pair and the y tuples describe one or more intermediate robotic locations at specific time stamps during the motion of the robot between the location pair. In embodiments, missing final values of the y tuples are obtaining by replicating values of the last available intermediate robotic location. In embodiments, a conversion formatting table is generated. The conversion formatting table maps the original format of the received training data into a numerical format for the x,y tuples suitable for machine learning. In embodiments, at least one of the intermediate robot locations are used as one of the desired location pairs for training purposes. In embodiments, the x tuples comprise one or more information pieces selected from the group consisting of: information on positions of the robotic location pair; information on robotic motion at the robotic location pair; and/or information on a differential position between a robotic tool tip point and a robotic tool frame point. In embodiments, information on positions of the robotic location pair of the x tuples are given as relative to a given reference frame of the robot. In embodiments, the y tuples comprise information on position of the one or more intermediate locations and/or information on robotic motion of the one or more intermediate robotic locations.

At act 515, from the processed data a function mapping the x tuples into the y tuples is learnt so as to generate a motion prediction module for the specific robot.

At act 520, for a given robotic location pair, the robotic motion between the given pair is predicted by getting the corresponding intermediate locations resulting from the motion prediction module. In embodiments, the motion prediction module is used by a robotic virtual simulation system.

In embodiments, the x tuple describing the location pair comprise at least information on the positions of the location pair (e.g. poses, positions and/or directions of the location pair) and, optionally, it may additionally comprise information on the robotic motion at the location pair (e.g. speed, acceleration, tension, state and/or other robotic motion related information at the location pair).

In embodiments, the x tuple comprises the minimum information required for describing the desired motion planning of the specific robot.

In embodiments, position information of the location pair and/or of the intermediate locations may conveniently be given as relative to a given reference frame of the specific robot. Preferably, the given reference frame of the specific robot may be the robot base frame as it is typically the case with downloaded robotic programs. Advantageously, in this manner, different base positions of specific robots can be flexibly supported by the ML prediction module.

In embodiments, the x tuple describing the location pair comprises robotic tool-related information. For example, robot tool-related information may comprise robot's tool type and/or tool differential position information. The differential tool position information may preferably be the delta between the robot's tool frame and the robot's TCPF frame. Advantageously, in this manner, different types of robotic tools/TCPFs can be flexibly supported by the ML prediction module and the related kinematic impact is then taken into account. Advantageously, embodiments wherein different robot's tools are used in different location pairs can be flexibly supported by the ML prediction module, e.g. for one location pair robot's tool A is used and for another location pair robot's tool B is used.

In embodiments, the information describing the location position may be given in the form of spatial coordinates describing the robot's tip position independently on the robot type or it may be given as robot poses (e.g. via robot's joint values). In other embodiments, the location position information may be given in other formats that may or may not be robot specific.

In embodiments, the y tuple describing the intermediate locations comprise at least information on the positions of the intermediate robotic locations and, optionally, it may additionally comprise robotic motion information at the locations.

In embodiments, the intermediate robotic location positions may be described as the robot's poses, e.g. with the robot's joint values. In other embodiments, the intermediate location positions may be described as spatial coordinates of the robotic tip. In other embodiments, the intermediate location may be described as location position information and the corresponding robotic motion information at those locations, for example, information on robotic states and/or characteristics such as speed acceleration, energy intake, and other characteristics in each of the time instances in which the motion is derived.

In embodiments, the y tuples comprise the minimum information required for enabling to simulating the robot's state at the corresponding time samples, e.g. the robot's joint values at such times.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter will be defined only by the claims of the issued patent(s).

The invention claimed is:

1. A data processing system for accurately predicting a motion trajectory of an industrial robot moving between a given pair of robotic locations in a robotic simulation system, the data processing system comprising:
   a processor; and
   an accessible memory connected to said processor, said processor being configured to:
   a) receive training data of motion trajectories of the robot for a plurality of robotic location pairs, and increase an amount of training data sets in the training data, wherein the training data that was received includes an original robotic location pair having an original start location and an original target location, wherein the amount of training data sets in the training data is increased by adding at least one training data set that includes a start location and a target location, and wherein the start location is an intermediate location positioned between the original start location and the original target location, and the target location is the original target location from the original robotic location pair;
   b) process the training data so as to obtain x tuples and y tuples for machine learning purposes; wherein the x tuples describe the robotic location pair and the y tuples describe one or more intermediate robotic locations with poses at specific time stamps during the motion of the robot between the location pair;

c) learn from the processed data a function mapping the x tuples into the y tuples so as to generate a motion prediction module for mimicking the kinematics motion behavior of the robot; and d) for a given robotic location pair, predict the robotic motion between the given pair by getting the corresponding intermediate locations resulting from the motion prediction module.

2. The data processing system according to claim 1, wherein said processor is configured to complete missing final values of the y tuples by replicating values of last available intermediate robotic location.

3. The data processing system according to claim 1, wherein said processor is configured to generate a conversion formatting table to map the original format of the received training data into a numerical format for the x,y tuples suitable for machine learning.

4. The data processing system according to claim 1, wherein said processor is configured to use at least one of the intermediate robot locations as one of the desired location pairs for training purposes.

5. The data processing system according to claim 1, wherein the x tuples comprise one or more information pieces selected from the group consisting of:
information on positions of the robotic location pair;
information on robotic motion at the robotic location pair; and
information on a differential position between a robotic tool tip point and a robotic tool frame point.

6. The data processing system according to claim 1, wherein the y tuples comprise information on robotic motion of the one or more intermediate robotic locations.

7. A non-transitory computer-readable medium encoded with executable instructions for accurately predicting a motion trajectory of an industrial robot moving between a given pair of robotic locations in a robotic simulation system, wherein the executable instructions when executed, cause one or more data processing systems to:

a) receive training data of motion trajectories of the robot for a plurality of robotic location pairs, and increase an amount of training data sets in the training data, wherein the training data that was received includes an original robotic location pair having an original start location and an original target location, wherein the amount of training data sets in the training data is increased by adding at least one training data set that includes a start location and a target location, and wherein the start location is an intermediate location positioned between the original start location and the original target location, and the target location is the original target location from the original robotic location pair;

b) process the training data so as to obtain x tuples and y tuples for machine learning purposes; wherein the x tuples describe the robotic location pair and the y tuples describe one or more intermediate robotic locations with poses at specific time stamps during the motion of the robot between the location pair;

c) learn from the processed data a function mapping the x tuples into the y tuples so as to generate a motion prediction module for mimicking the kinematics motion behavior of the robot; and d) for a given robotic location pair, predict the robotic motion between the given pair by getting the corresponding intermediate locations resulting from the motion prediction module;

wherein the executable instructions further cause the one or more data processing systems to complete missing final values of the y tuples by replicating values of last available intermediate robotic location.

* * * * *